M. M. KAHN.
SWITCH HOOK CONTROLLING DEVICE.
APPLICATION FILED OCT. 29, 1908.
932,557.    Patented Aug. 31, 1909.
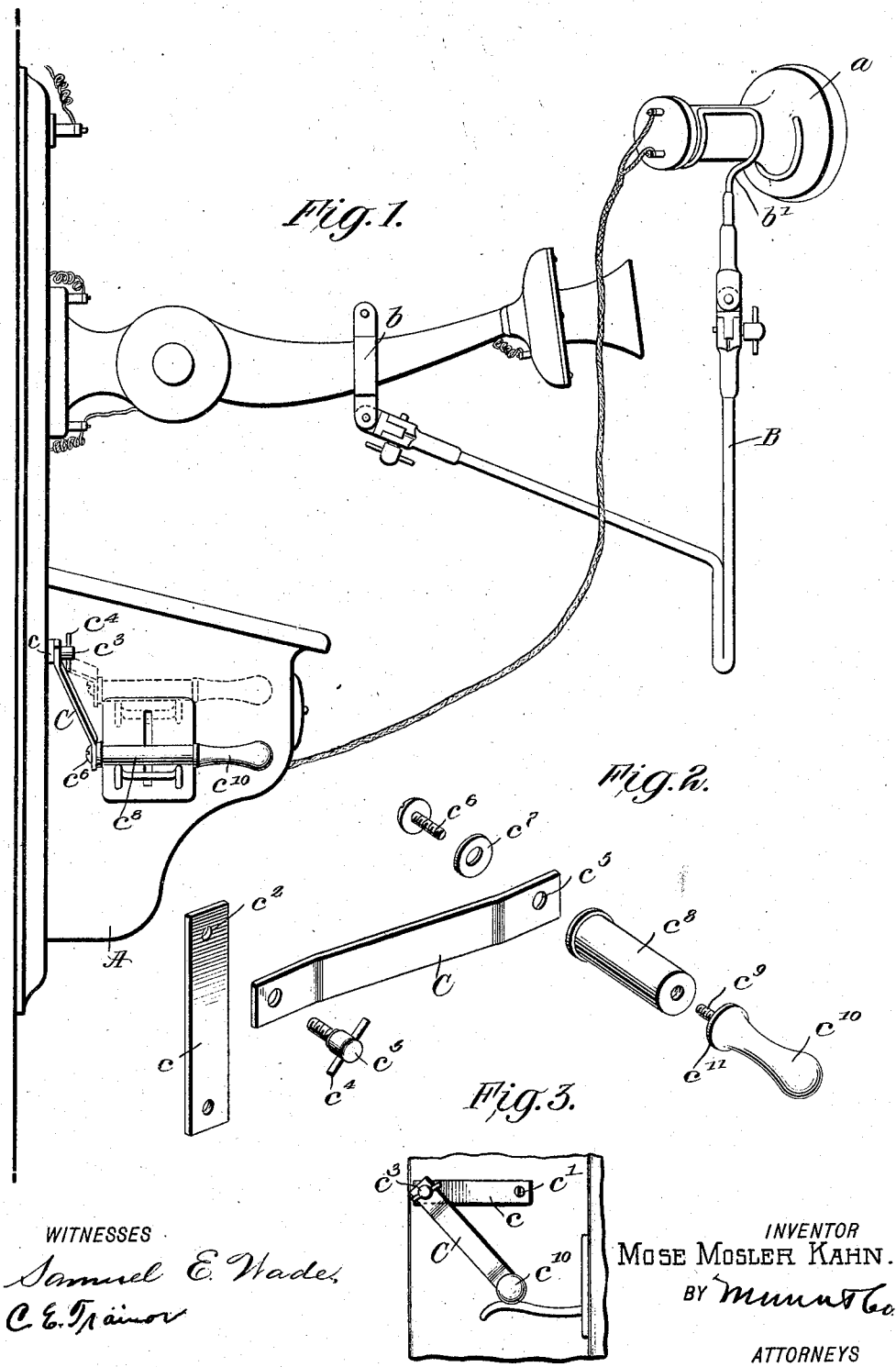
WITNESSES
Samuel E. Wade
C. E. Trainor
INVENTOR
Mose Mosler Kahn.
BY Munn & Co.
ATTORNEYS

UNITED STATES PATENT OFFICE.

MOSE MOSLER KAHN, OF LOUISVILLE, KENTUCKY.

SWITCH-HOOK-CONTROLLING DEVICE.

932,557.  Specification of Letters Patent. Patented Aug. 31, 1909.

Application filed October 29, 1908. Serial No. 460,061.

*To all whom it may concern:*

Be it known that I, MOSE MOSLER KAHN, a citizen of the United States, and a resident of Louisville, in the county of Jefferson and State of Kentucky, have invented certain new and useful Improvements in Switch-Hook-Controlling Devices, of which the following is a specification.

My invention is an improvement in switch hook controlling devices, and consists in certain novel constructions and combinations of parts hereinafter described and claimed.

The object of the invention is to provide a device for engaging the receiver hook, when the receiver is supported by the adjustable support shown and described in my previous patent No. 898,898 dated Sept. 15, 1908.

Referring to the drawings forming a part hereof Figure 1 is a side view of a wall box provided with the improvement, Fig. 2 is a perspective view of the improvement, the parts being separated, and Fig. 3 is a front view.

In the present embodiment of my invention, the device is shown applied to a wall box A, and connected with the transmitter arm, is the receiver support B, having a clamp $b$, for engaging the arm, and a rest $b'$, in which rests the receiver $a$.

As is well known, the removal of the receiver from the yoke or hook in which it is supported on the wall box, or other support for the transmitter, cuts out the signaling apparatus from the line, and to retain the hook or yoke in its lowermost position while the telephone is not in use, I provide a weighted arm arranged to rest upon the hook or yoke when the telephone is not in use. The arm comprises a bracket $c$, having through one end a hole for receiving a screw $c'$, whereby it may be attached to the wall box or other support, and at its other end a threaded opening $c^2$.

The arm C is provided at one of its ends with an opening, through which passes a thumb screw $c^3$, the threaded end of which passes through the threaded opening in the bracket or support $c$, and the thumb screw is provided with a pin $c^4$, passing transversely through the head of the screw, for convenience in manipulating the same. The opposite end of the arm is provided with an opening $c^5$, through which passes a screw $c^6$ having a washer $c^7$, arranged between the head of the screw and the arm, and the threaded end of the screw engages a threaded opening in a cylindrical weight $c^8$, which weight is adapted to rest on the hook or yoke as the case may be, for retaining it in closed position. The free end of the weight is provided with a threaded opening, in which screws the threaded stem $c^9$, of a grip $c^{10}$, the grip being provided with a shoulder $c^{11}$ for engaging the end of the weight.

In operation, the weighted arm normally rests upon the hook or weight in the position shown in Fig. 1, in full lines. When however, the telephone is in use, the arm is thrown backwardly into position shown in dotted lines in the same figure, and may be secured in this position by means of the set screw. After the telephone has been used, the arm is again turned forwardly into engagement with the hook or yoke.

It will be observed from an inspection of Fig. 2, that the ends of the arm C are offset from each other, in order to permit the free end of its arm to clear the side of the wall box.

I claim:

1. A device of the class described, comprising a bracket provided at one end with an opening whereby it may be attached to a transmitter support, and at the other with a threaded opening, an arm provided at each end with openings, a set screw passing through one of said openings, and engaging the threaded opening of the support, a cylindrical weight provided at each end with a cylindrical opening, a screw passing through the other opening of the arm and engaging one of the threaded openings of the weight, and a grip having a threaded stem engaging the other opening.

2. A device of the class described, comprising a bracket for attachment to a transmitter support, an arm pivoted by one end to the end of the bracket, a cylindrical weight connected with the other end of the arm, a grip on the weight, and means for fixing the arm with respect to the bracket.

MOSE MOSLER KAHN.

Witnesses:
NELLIE G. KAHN,
SAML. S. BLITZ.